US010953425B2

(12) United States Patent
Unidad et al.

(10) Patent No.: US 10,953,425 B2
(45) Date of Patent: Mar. 23, 2021

(54) METHODS AND SYSTEMS FOR COLLECTING DROPLETS OF STRAIN HARDENING VISCOELASTIC FLUIDS IN A SPRAY

(71) Applicant: PALO ALTO RESEARCH CENTER INCORPORATED, Palo Alto, CA (US)

(72) Inventors: Herwin Jerome Unidad, San Francisco, CA (US); Ravi Neelakantan, Redwood City, CA (US); Jamie Kalb, Mountain View, CA (US); Elif Karatay, Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 53 days.

(21) Appl. No.: 15/962,580

(22) Filed: Apr. 25, 2018

(65) Prior Publication Data
US 2019/0329278 A1 Oct. 31, 2019

(51) Int. Cl.
*B05B 12/32* (2018.01)
*B05B 12/18* (2018.01)
*B05B 3/02* (2006.01)
*B05B 7/00* (2006.01)
*B05B 12/26* (2018.01)
*B05B 3/10* (2006.01)
(Continued)

(52) U.S. Cl.
CPC ............ *B05B 12/26* (2018.02); *B05B 3/026* (2013.01); *B05B 3/1035* (2013.01); *B05B 7/0075* (2013.01); *B05B 12/18* (2018.02);

*B05B 12/32* (2018.02); *B01J 13/0095* (2013.01); *B05B 9/03* (2013.01)

(58) Field of Classification Search
CPC ......... B05B 12/26; B05B 12/32; B05B 12/18; B05B 3/026; B05B 3/1035; B05B 7/0075; B05B 9/03; B01J 13/0095; B41C 1/1066; B41F 7/30; B05C 9/12; B05C 11/06
USPC .......................... 239/22, 288; 347/47; 118/58
See application file for complete search history.

(56) References Cited

U.S. PATENT DOCUMENTS 2,291,046 A * 7/1942 Lange .............................. 261/84
3,873,025 A * 3/1975 Qvarnstrom .............. B05B 3/02
239/220

(Continued)

FOREIGN PATENT DOCUMENTS

EP 2868389 A1 5/2015
EP 3124122 A1 2/2017

OTHER PUBLICATIONS

European Search Report, EP19170434.5, dated Sep. 19, 2019.

*Primary Examiner* — Joseph A Greenlund
(74) *Attorney, Agent, or Firm* — Miller Nash Graham & Dunn LLP

(57) ABSTRACT

An aerosol creation system can include a pair of counter-rotating rollers configured to be positioned adjacent each other and define a nip between each other, a fluid source configured to provide a fluid to the nip, a driving element configured to drive the pair of counter-rotating rollers to rotate in counter rotation with respect to each other and cause the fluid to be drawn through the nip, and a collection shell configured to be positioned substantially around the pair of counter-rotating rollers, the collection shell having a nozzle configured to allow passage of the fluid from the nip.

14 Claims, 12 Drawing Sheets

(51) Int. Cl.
*B01J 13/00* (2006.01)
*B05B 9/03* (2006.01)

(56) References Cited

U.S. PATENT DOCUMENTS

| | | | | |
|---|---|---|---|---|
| 4,034,670 A | * | 7/1977 | Zavodny | B41F 7/30 101/148 |
| 4,078,725 A | * | 3/1978 | Bauer | B05B 3/02 118/DIG. 16 |
| 4,106,429 A | * | 8/1978 | Phillips | B05C 11/06 118/413 |
| 4,204,644 A | * | 5/1980 | Kozuka | B05B 3/02 239/220 |
| 4,416,919 A | * | 11/1983 | Beck | B05C 11/06 118/50 |
| 5,665,160 A | * | 9/1997 | Davene | B05C 3/125 118/58 |
| 5,800,652 A | * | 9/1998 | Vigneau | B65H 19/29 156/184 |
| 6,692,570 B2 | * | 2/2004 | Cottier | C04B 18/08 118/300 |
| 9,639,050 B2 | * | 5/2017 | Veres | G03G 17/02 |
| 9,757,747 B2 | * | 9/2017 | Johnson | B05B 9/03 |
| 9,782,790 B2 | * | 10/2017 | Beck | B01J 13/0095 |
| 9,878,493 B2 | * | 1/2018 | Paschkewitz | B05B 17/04 |
| 9,962,673 B2 | * | 5/2018 | Beck | B05B 3/02 |
| 2002/0136838 A1 | * | 9/2002 | Kanke | B05C 5/007 427/420 |
| 2003/0104130 A1 | * | 6/2003 | Karlsson | B05C 11/04 427/348 |
| 2004/0053782 A1 | * | 3/2004 | Holder | B01J 20/103 502/400 |
| 2010/0221046 A1 | * | 9/2010 | Ruiz | G03G 15/2028 399/323 |
| 2014/0367481 A1 | * | 12/2014 | Toh | B05B 1/24 239/11 |
| 2015/0115057 A1 | * | 4/2015 | Beck | B05B 17/04 239/8 |
| 2015/0343407 A1 | * | 12/2015 | Johnson | B05B 3/02 516/6 |
| 2015/0343477 A1 | * | 12/2015 | Johnson | B05B 3/02 239/1 |
| 2016/0346806 A1 | * | 12/2016 | Schulz | B05B 13/0221 |
| 2017/0028414 A1 | * | 2/2017 | Beck | B05B 3/08 |
| 2017/0028415 A1 | * | 2/2017 | Beck | B05B 3/082 |
| 2019/0015862 A1 | * | 1/2019 | Johnson | B05D 1/02 |
| 2019/0329278 A1 | * | 10/2019 | Unidad | F26B 3/12 |

* cited by examiner

METHODS AND SYSTEMS FOR COLLECTING DROPLETS OF STRAIN HARDENING VISCOELASTIC FLUIDS IN A SPRAY

TECHNICAL FIELD

The disclosed methods and systems generally relate to spray deposition systems and methods and more specifically to the controlled collection and direction of such spray in such systems.

BACKGROUND

Many manufacturing and industrial applications benefit from fluid atomization to create a fine vapor mist or aerosol, such as the fuel/air mixture used in combustion applications, atomized air-paint mixtures for spray painting, application of coatings to pharmaceuticals, adhesive applications, and the like. Once a component solution is made into an aerosol it can be readily processed to coat virtually any shaped surface. Alternatively, in the pharmaceutical industry, aerosols are commonly used in a process called "spray-drying" to create fine powders that serve as upstream component solutions to create active pharmaceutical ingredients.

Regarding prior techniques for the spray processing of viscoelastic fluids, such fluids often exhibit strain hardening behavior that suppresses droplet formation in conventional atomization methods. Some systems take advantage of this strain hardening behavior and harness it to generate droplets through an elastocapillary instability. FIG. 14 illustrates an example of such a system 1400 that includes a spray mechanism having two counter rotating rollers 1402 and 1404 that are in hard contact with each other. Such systems generally allow for the spraying of viscoelastic fluids both at room temperature (e.g., polymer solutions and complex formulations) and at elevated temperatures (e.g., polymer melts).

Existing technologies can work with large rollers or small rollers. For example, whereas large rollers may be used for high throughput applications (e.g., as a unit operation at the end of a manufacturing line for producing droplets or powders), small rollers may be used for smaller output but at an equally small device footprint (e.g., as a handheld device for precision dispensing).

The collection of the spray produced is generally integral to the spray technology. The spray droplets tend to naturally follow their own trajectory based on their initial velocity (e.g., upon filament break-up) and droplet size. These trajectory lines often follow a spray cone 1410. Depending on different parameters such as the roller diameter, roller speeds, contact force, and the fluid rheology, this spray cone 1410 is usually wide enough to make controlled deposition on a limited difficult.

FIG. 15 illustrates a system 1500 for obtaining controlled deposition on a limited area that includes the use of a mask 1504 (or, alternatively, a sheet with an orifice) to block the unwanted spray fraction of the spray cone 1510 from the spray source 1502, such as a pair of counter-rotating rollers. While this system 1500 may limit the delivery area to a limited space 1512 on a surface 1520, the system is also significantly inefficient in that most of the unwanted spray collects on the mask 1504 (or sheet).

Over time, this collected volume will accumulate and likely eventually drip, which would be unsanitary for particular applications (e.g., the application of drug formulations and consumer products). This system 1500 is also wasteful, particularly for high value fluids that are only available in limited volumes (e.g., specialized drugs and bioactives manufactured in the μg scale).

Therefore, methods and systems that reduce the amount of wasted spray would be beneficial in the art.

DETAILED DESCRIPTION

Embodiments of the disclosed technology are generally directed to systems and methods for the efficient collection of the spray produced in spray processing. Such embodiments may include a downscaled system, e.g., a system having 5-50 mm rollers, and may include a collection shell leading to a nozzle having a suitable geometry and controlled air flow using air knives positioned and oriented to increase collection of the spray therethrough.

Embodiments of the disclosed technology may advantageously enable the collection of a large portion, e.g., up to or over 85%, of the liquid that is input into the system. Prior systems have efficiencies less than 1% in larger roller systems (e.g., greater than 50 mm roller diameter) and at 10% in smaller roller systems (e.g., less than 50 mm roller diameter). Certain embodiments in accordance with the disclosed technology may further focus the spray into a defined and limited area, e.g., an area of the order of 1-2 $cm^2$, which is comparable to the exposed surface area of the human eye.

Figure 1:
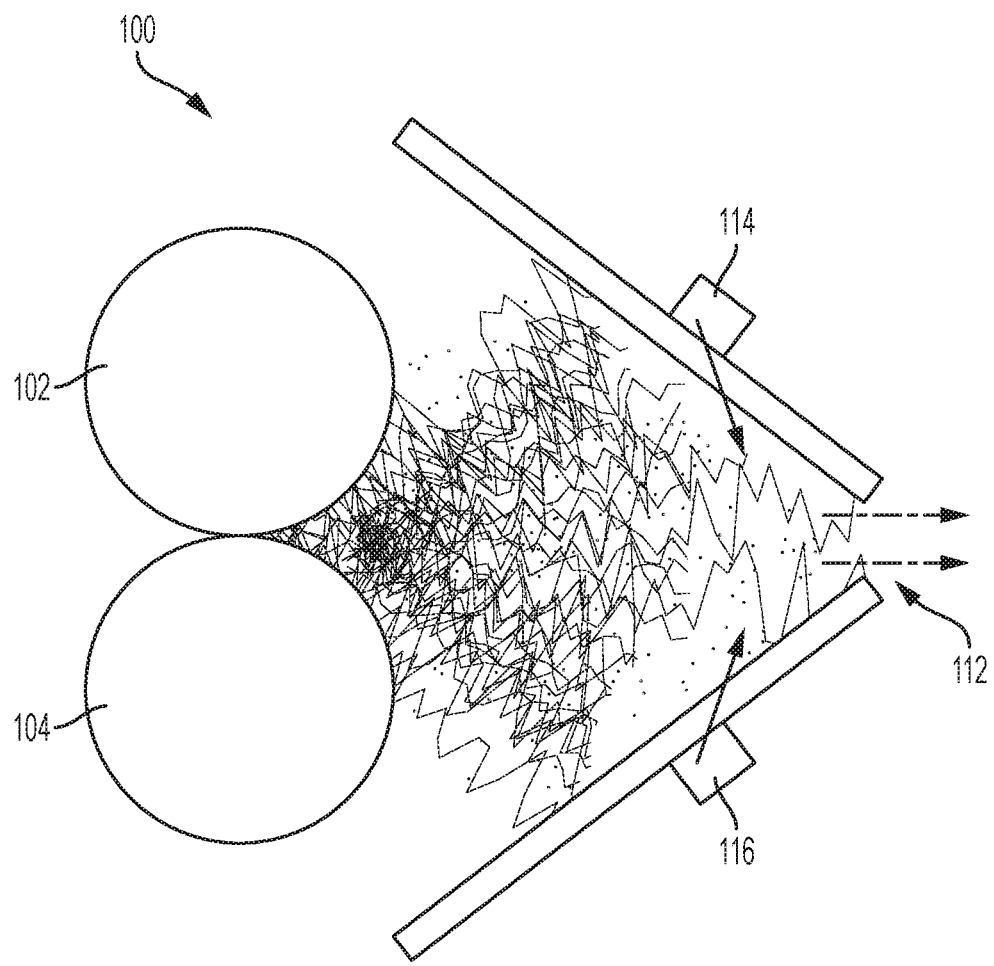
FIG. 1 is a functional diagram illustrating an example of an aerosol producing system in accordance with certain embodiments of the disclosed technology.

FIG. 1 is a functional diagram illustrating an example of an aerosol producing system 100 in accordance with certain embodiments of the disclosed technology. In the example, the system 100 has a pair of counter-rotating rollers 102 and 104 that are in contact with each other, and a collection shell around the rollers 102 and 104 configured to collect the spray efficiently along its natural direction. The collection shell has a converging profile designed to guide the spray produced at the nip (e.g., the point of roller contact) into and through a nozzle 112 (e.g., exit port) that is integrated with the collection shell.

In the example, the system 100 also includes a pair of air knives 114 and 116 that are configured to assist with the redirection of the spray into the nozzle 112. The air knives 114 and 116 are generally designed and placed strategically for collection of the spray at the nozzle 112. The air flow induced by the air knives 114 and 116 is generally tangential to the surface of the collection shell but may be at any suitable angle therefrom.

Figure 2:
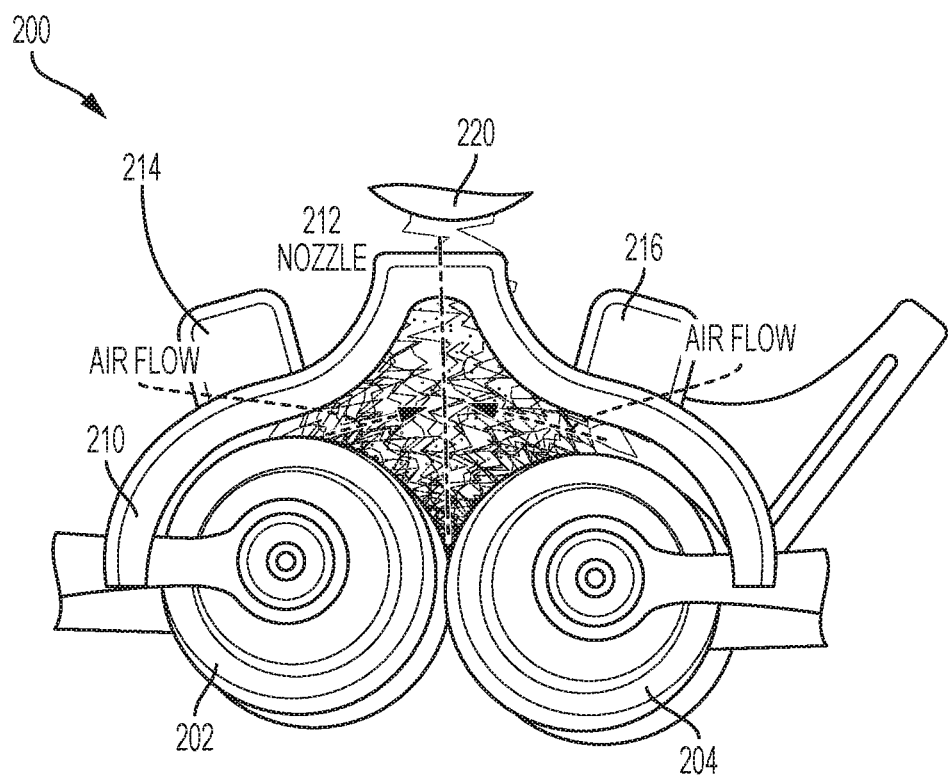
FIG. 2 illustrates a first example of an aerosol producing system in accordance with certain embodiments of the disclosed technology.

FIG. 2 illustrates a first example of an aerosol producing system 200 in accordance with certain embodiments of the disclosed technology. In the example, the system 200 has a pair of counter-rotating rollers 202 and 204 and a collection shell 210 around the rollers 202 and 204 configured to collect the spray efficiently along its natural direction. The collection shell 210 has a converging profile designed to guide the spray produced at the nip (e.g., the point of roller contact) into a nozzle 212 (e.g., exit port) that is integrated with the collection shell 210.

In the example, the system 200 also includes a pair of air knives 214 and 216 that are configured to assist with the redirection of the spray into the nozzle 212. As used herein, the term air knife generally refers to a device or component having a narrow opening through which air may be forced, e.g., by a certain type of fan or blower or other suitable device.

The air knives 214 and 216 are generally designed and placed along the spray cone. The inlet pressure into the air knives 214 and 216 may be optimized for maximal collection of the spray at the nozzle 212 (e.g., measured as collected mass over exposure time). The air flow induced by the air knives 214 and 216 is generally tangential to the surface of the collection shell 210.

Determination and maintenance of the amount air flow in the system is integral for guiding the spray and minimizing spray deposition in the shell surface near the nozzle. The air flow from the air knives 214 and 216 creates fast moving streamlines close to the surface of the collection shell 210 that prevent particles from impinging and collecting on the surface. There is typically a critical level of air flow through the air knives 214 and 216 for redirecting the spray into the nozzle 212. If the air flow is below or above this value, the spray collection efficiency is usually suboptimal.

In the example, the nozzle 212 may be modular and readily interchangeable with the rest of the system 200. For example, the nozzle 212 may be positioned on the collection shell 210 and secured by any suitable securing mechanism. The geometry of the nozzle 212 can be modified depending on the intended deposition area, e.g., with respect to the nascent spray profile.

For certain applications (e.g., ocular deposition), the nozzle geometry may be selected to more closely match the exposed surface area of the eye. Such selection may also have a slight effect on the collection efficiency given the natural splay of the spray cone, for example. The design of the collection shell 210 and focusing of air flow by way of the air knives 214 and 216 may be based on the natural spray cone profile, for example.

Figure 5:
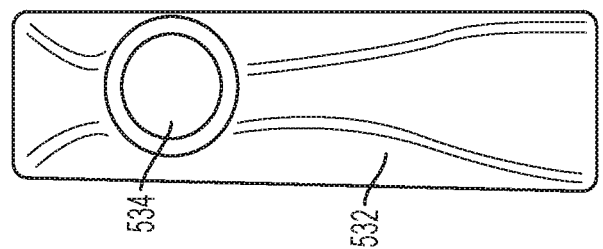
FIG. 5 illustrates an example of a collection shell nozzle that has a circular opening in accordance with certain embodiments of the disclosed technology.
Figure 4:
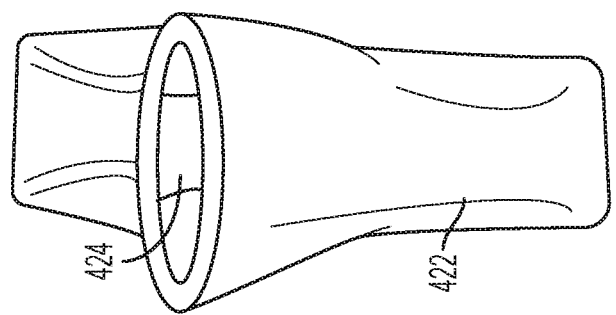
FIG. 4 illustrates an example of a collection shell nozzle that has an elliptical opening that is parallel to the splay angle in accordance with certain embodiments of the disclosed technology.
Figure 3:
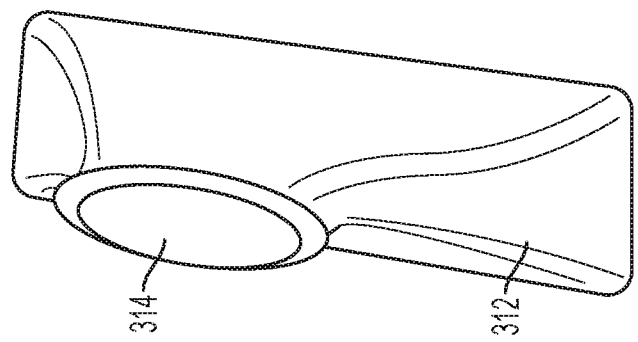
FIG. 3 illustrates an example of a collection shell nozzle that has an elliptical opening that is perpendicular to the splay angle in accordance with certain embodiments of the disclosed technology.

FIGS. 3-5 illustrate three different types of nozzle geometries that may be implemented. FIG. 3 illustrates a nozzle 312 having an elliptical opening 314 that is perpendicular to the splay angle, FIG. 4 illustrates a nozzle 422 having an elliptical opening 424 that is parallel to the splay angle, and FIG. 5 illustrates a nozzle 532 having a circular opening 534. It should be noted that the factor difference between the exit port geometries is generally small given the already large spray collection yield.

Figure 6:
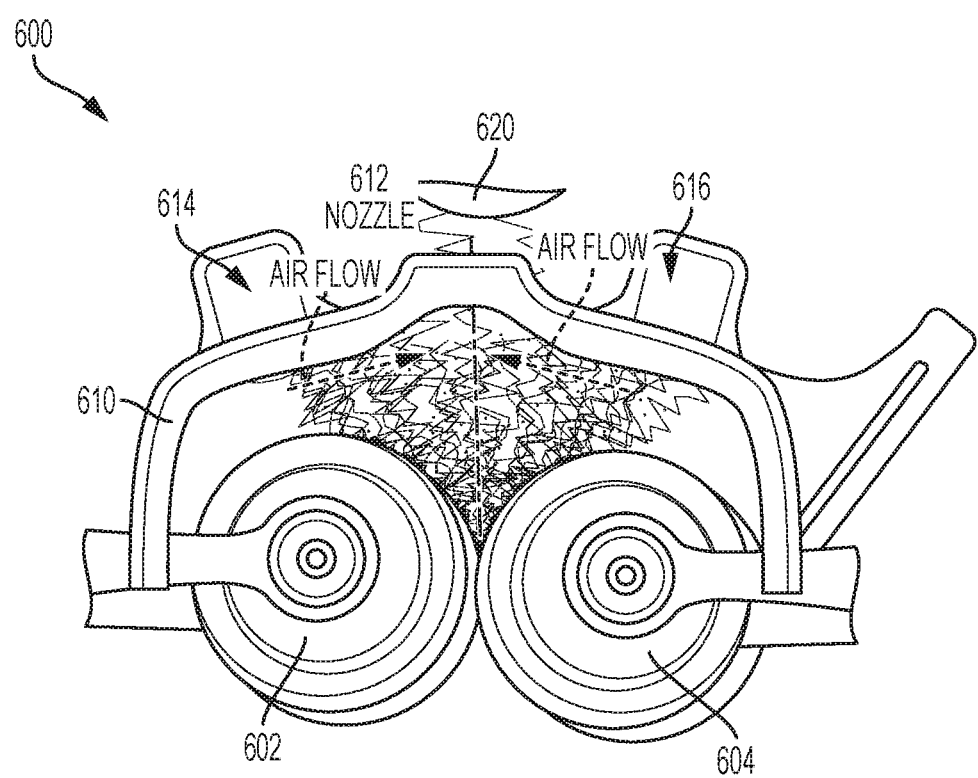
FIG. 6 illustrates a second example of an aerosol producing system in accordance with certain embodiments of the disclosed technology.

FIG. 6 illustrates a second example of an aerosol producing system 600 in accordance with certain embodiments of the disclosed technology. Similar to the system 200 illustrated by FIG. 2, the system 600 includes a pair of counter-rotating rollers 602 and 604, a collection shell 610 having a nozzle 612, and a pair of air knives 614 and 616 configured to direct the spray toward and through the nozzle 612. It should be noted that the collection shell 610 of FIG. 6 has a different shape (e.g., curvature) than the collection shell 210 illustrated by FIG. 2.

In certain embodiments, optimal air flow for the collection shell 210 of FIG. 2 may be approximately 20-30 standard cubic feet per hour whereas the optimal air flow for the collection shell 610 of FIG. 6 is approximately 40-50 standard cubic feet per hour. At these air flows, the spray collection efficiency can increase to as high as 85% or even greater.

Figure 7:
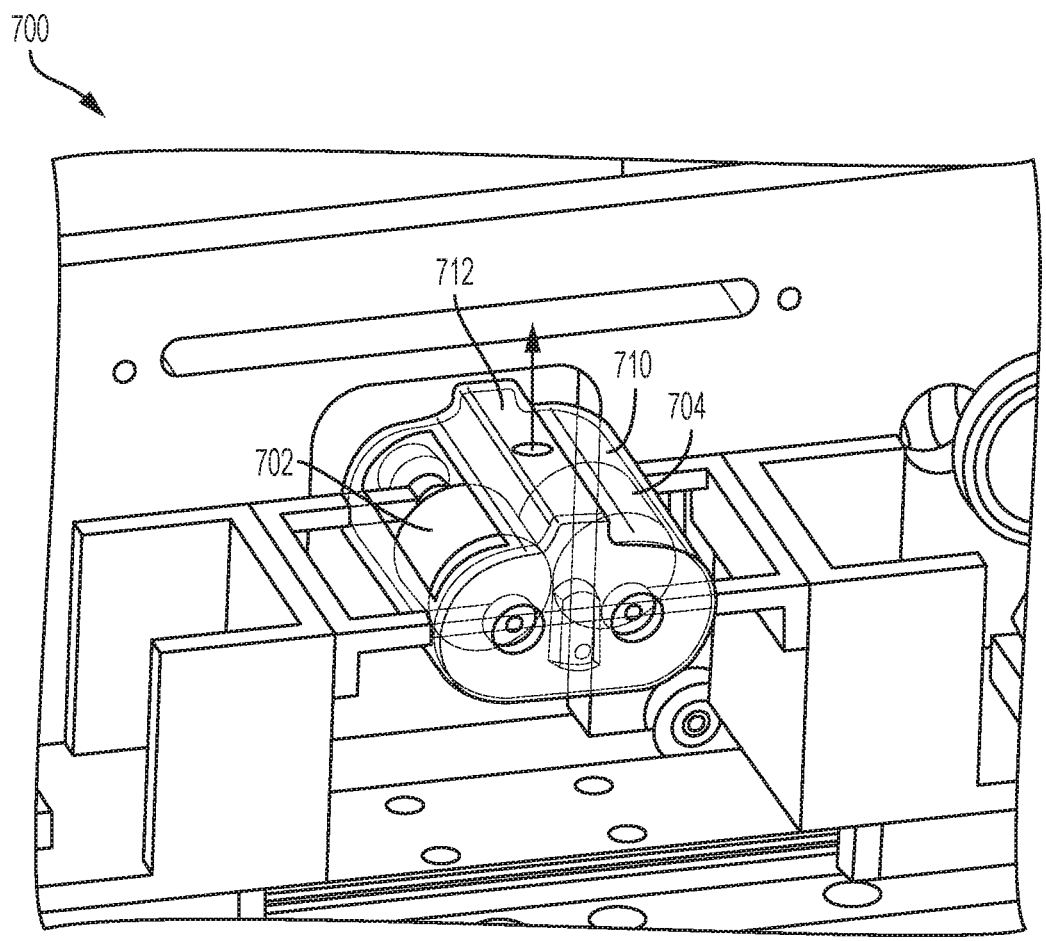
FIG. 7 illustrates a third example of an aerosol producing system in accordance with certain embodiments of the disclosed technology.

FIG. 7 illustrates a third example of an aerosol producing system 700 in accordance with certain embodiments of the disclosed technology. In the example, a collection shell 710 having a nozzle 712 is created, e.g., by way of three-dimensional (3D) printing, with a design and geometry that is based on the natural spray cone resulting from the rollers 702 and 704.

In the example, the collection shell 710 is configured to fit and enclose the rollers in a benchtop test bed and direct the spray to a limited area. The collection shell 710 may be connected to an external clean air source and a flow meter with a needle valve used to regulate the inlet pressure (e.g., effective volume flow rate) into the air knives.

In certain embodiments, a collection shell may be integrated in a handheld system. The curvature and design of the collection shell and nozzle and the optimized air flow may ensure that the produced spray is directed into the desired area, such as the exposed surface of the human eye of a patient, for example. Other implementations may include, but are not limited to, coating the surface of a patient's mouth or nose (e.g., for oral/nasal fluid delivery), certain spots in the skin (e.g., for applying cosmetics), or a much larger area (e.g., for applying coatings).

Certain implementations may include designing a collection shell for collecting and conveying droplets from other spray sources having different spray cone profiles (e.g., a wide splay in both planes, or true conical spray profiles). Also, nozzle shapes may be designed for other applications where different degrees of redirection may be needed, e.g., in the application of particular types of coatings.

Figure 8:
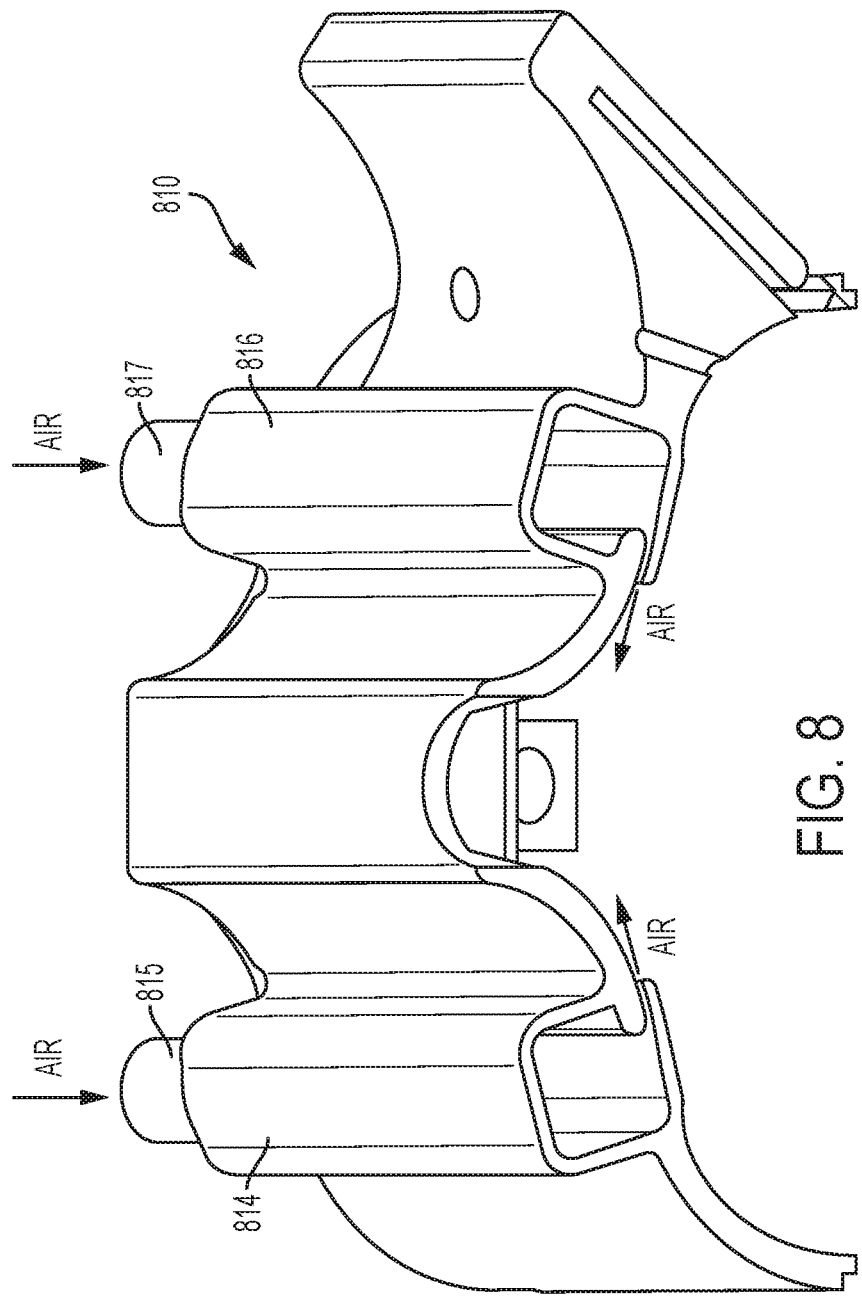
FIG. 8 illustrates a perspective cross-sectional view of two air knives integrated with a collection shell in accordance with certain embodiments of the disclosed technology.
Figure 9:
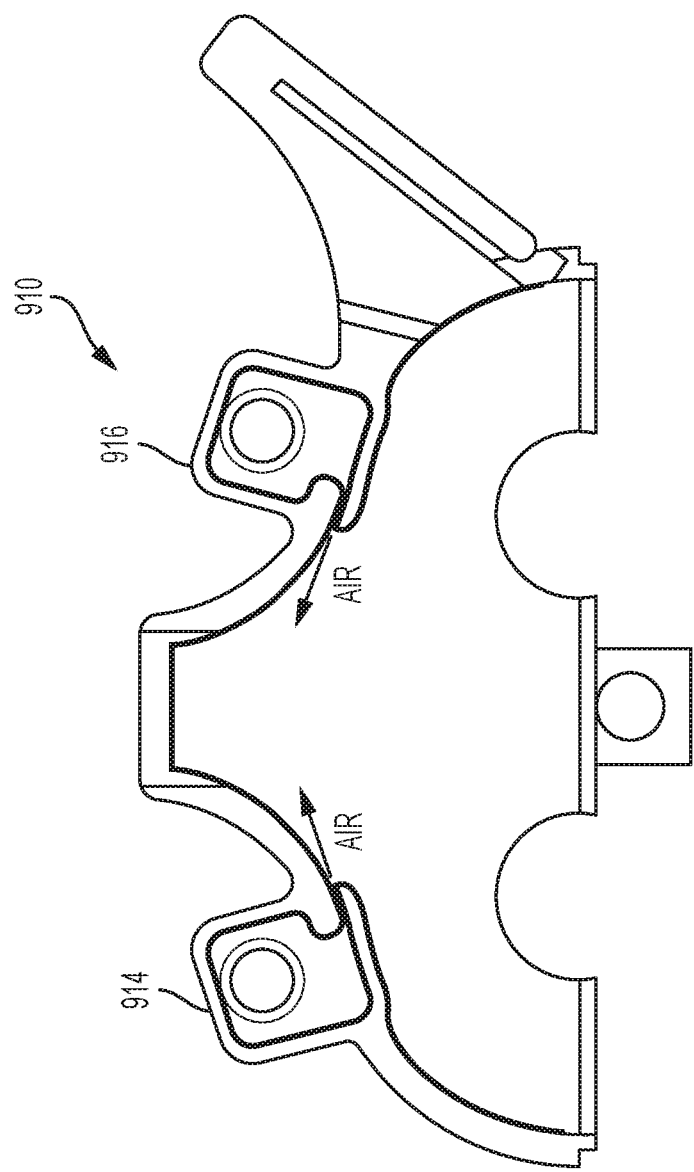
FIG. 9 illustrates a side cross-sectional view of two air knives integrated with a collection shell in accordance with certain embodiments of the disclosed technology.
Figure 10:
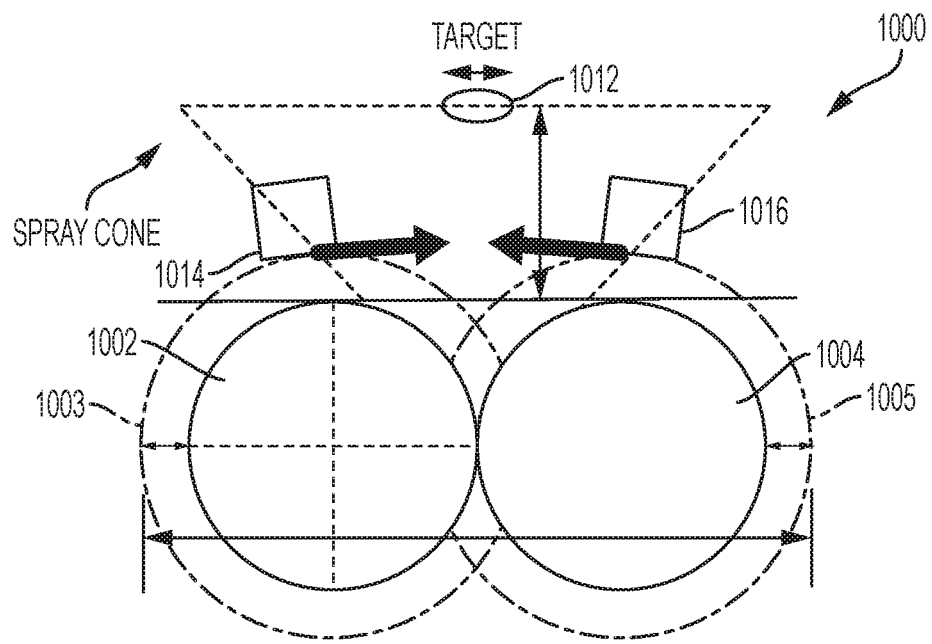
FIG. 10 illustrates a cross-sectional view of a first example of two air knives whose positioning and geography are defined by the pair of counter-rotating rollers, the spray cone, and the target in accordance with certain embodiments of the disclosed technology.
Figure 11:
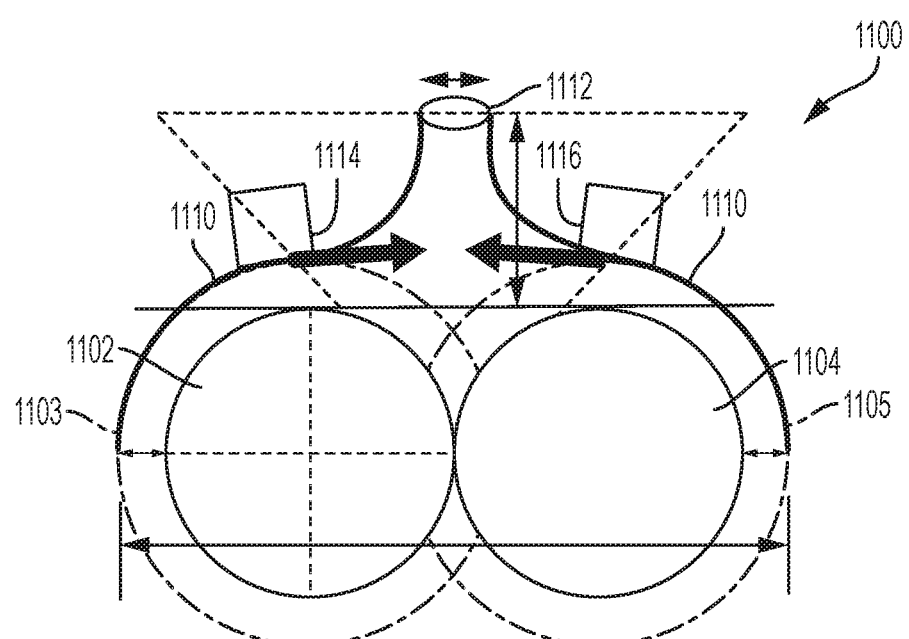
FIG. 11 illustrates a cross-sectional view of a first example of a collection shell whose curvature is defined by the pair of counter-rotating rollers, the spray cone, and the target in accordance with certain embodiments of the disclosed technology.
Figure 12:
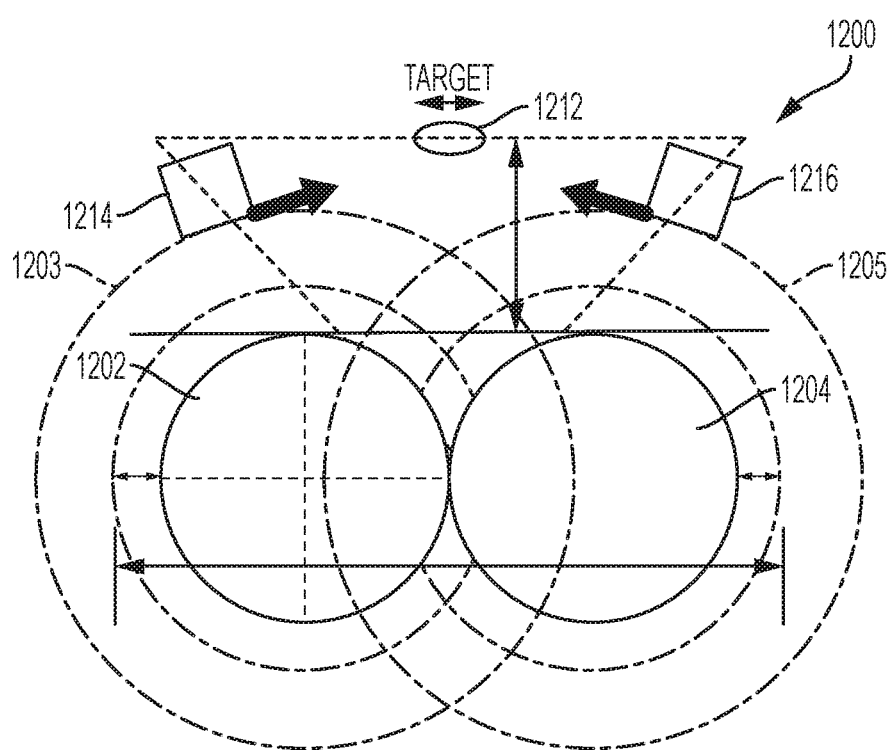
FIG. 12 illustrates a cross-sectional view of a second example of two air knives whose positioning and geography are defined by the pair of counter-rotating rollers, the spray cone, and the target in accordance with certain embodiments of the disclosed technology.
Figure 13:
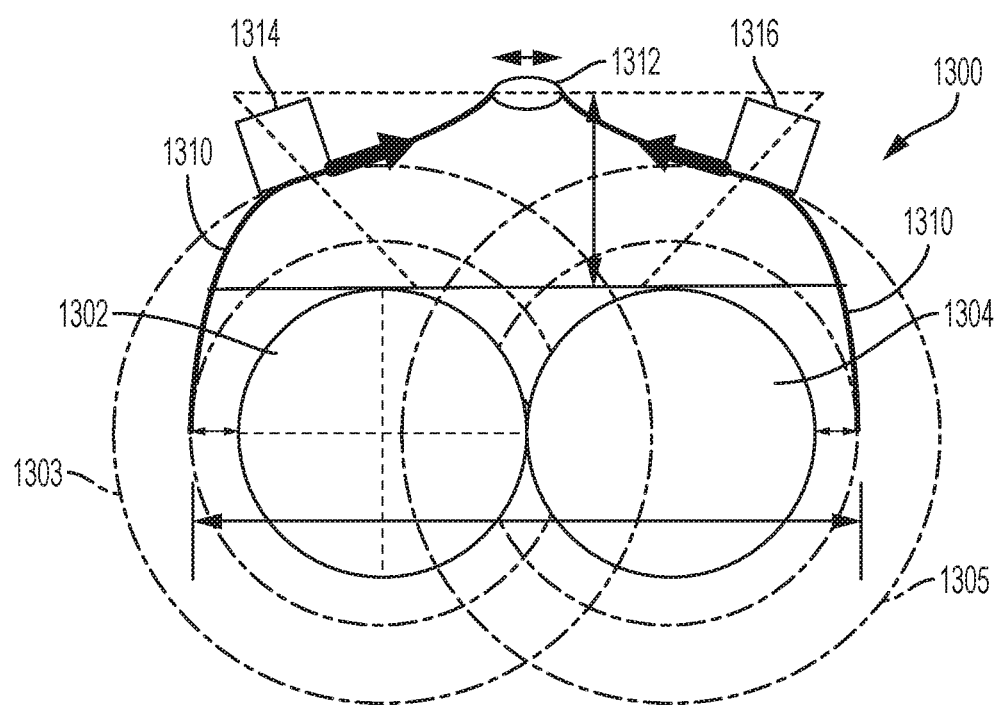
FIG. 13 illustrates a cross-sectional view of a second example of a collection shell whose curvature is defined by the pair of counter-rotating rollers, the spray cone, and the target in accordance with certain embodiments of the disclosed technology.
Figure 14:
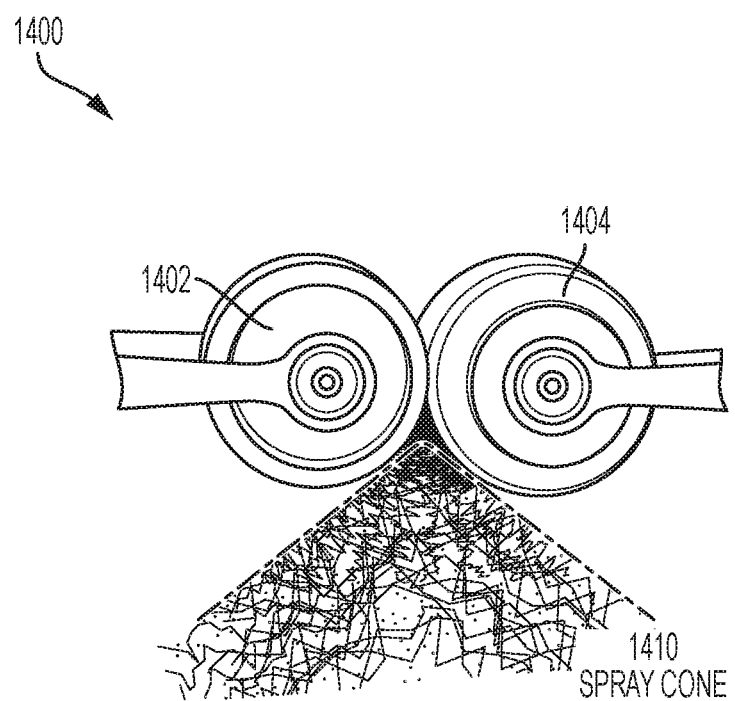
FIG. 14 illustrates an example of a prior atomizer for the spray processing of viscoelastic fluids.
Figure 15:
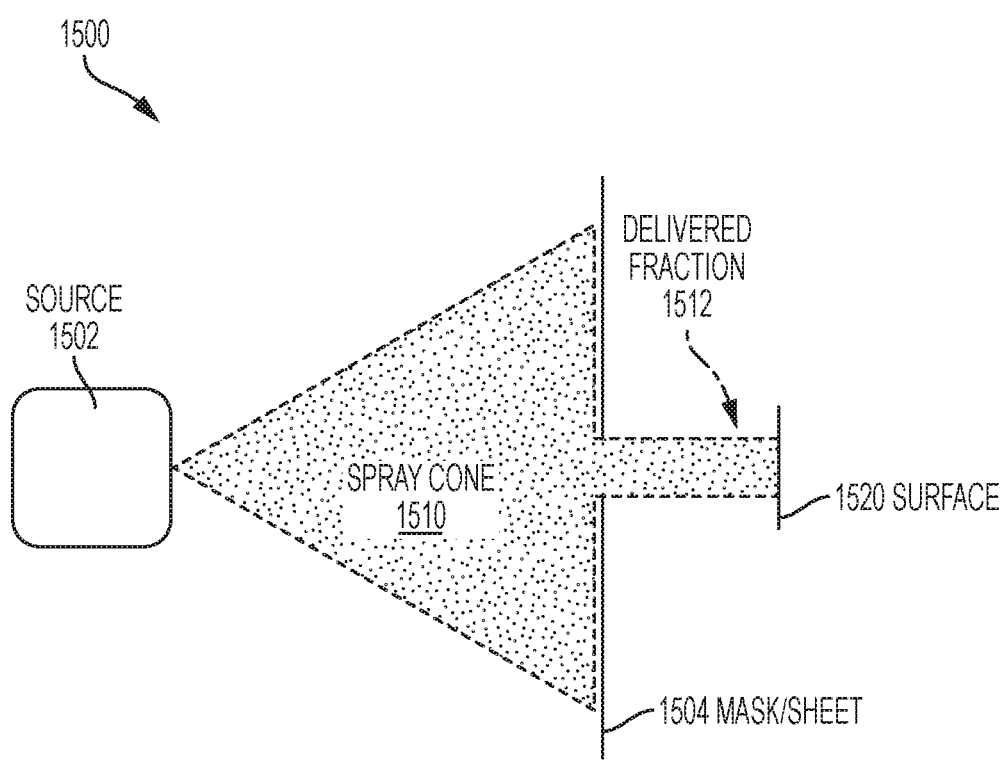
FIG. 15 illustrates an example of a prior system for obtaining controlled deposition on a limited area that includes the use of a mask.

FIG. 8 illustrates a perspective cross-sectional view of two air knives 814 and 816 that are integrated with a collection shell 810 in accordance with certain embodiments of the disclosed technology. In the example, two air-moving devices 815 and 817 are respectively integrated with the air knives 814 and 816 to provide air through the air knives 814 and 816 into the interior of the collection shell 810 as indicated by the arrows.

FIG. 9 illustrates a side cross-sectional view of two air knives 914 and 916 that are integrated with a collection shell 910 in accordance with certain embodiments of the disclosed technology. In the example, air is moved through the air knives 914 and 916 into the interior of the collection shell 910 as indicated by the arrows.

In certain implementations, the position/location and orientation of each of the air knives may be determined based on any of a number of particular factors. For example, the position/location of each air knife may be based on the spray cone such that, no matter how far the air knife is located away from the roller surface, the air knife will still be along the spray cone. The orientation of each air knife, which generally controls the direction of the air flow that is induced by the air knife, is then selected such that the air flow is tangential to a circle concentric with the roller and simultaneously against the direction of the spray cone, for example. The effect of this position and orientation is reduction of the splay of the spray cone.

FIG. 10 illustrates a cross-sectional view of a first example 1000 of two air knives 1014 and 1016 whose positioning and geography are defined by the pair of counter-rotating rollers 1002 and 1004, the spray cone, and the target 1012 (e.g., nozzle) in accordance with certain embodiments of the disclosed technology. In the example, the location and positioning of the air knives 1014 and 1016 are defined at least in part by a distance from the counter-rotating rollers 1002 and 1004 as illustrated by respectively corresponding concentric circles 1003 and 1005 and equally by collocation of air knives 1014 and 1016 along the spray cone. In the example, the air knives 1014 and 1016 are positioned at the intersection of the spray cone and concentric circle from the roller and oriented such that the air flow through them is tangential to the concentric circles 1003 and 1005, respectively.

In the example 1000, the position/location of each of the air knives 1014 and 1016 is based on the spray cone emanating from the counter-rotating rollers 1002 and 1004 such that the air knives 1014 and 1016 direct air against the spray cone with the effect of reducing its splay. Further, the orientation of each of the air knives 1014 and 1016 is based on its distance from the closest counter-rotating roller 1002 and 1004, respectively, as represented by the concentric circles 1003 and 1005, respectively.

FIG. 11 illustrates a cross-sectional view of a first example 1100 of a collection shell 1110 whose curvature is defined by the pair of counter-rotating rollers 1102 and 1104, the spray cone, and the target 1112 in accordance with certain embodiments of the disclosed technology. In the example, the shape (e.g., curvature) of the collection shell 1110 and location/positioning of the air knives 1114 and 1116 are defined at least in part by a distance from the counter-rotating rollers 1102 and 1104 as illustrated by respectively corresponding concentric circles 1103 and 1105. In the example, the air knives 1114 and 1116 are positioned at the intersection of the spray cone and concentric circle from the roller and oriented such that the air flow through them into the interior of the collection shell 1110 is tangential to the concentric circles 1103 and 1105, respectively.

In the example 1100, the position/location of each of the air knives 1114 and 1116 is based on the spray cone emanating from the counter-rotating rollers 1102 and 1104 such that the air knives 1114 and 1116 direct air against the spray cone with the effect of reducing its splay. Further, the orientation of each of the air knives 1114 and 1116 is based on its distance from the closest counter-rotating roller 1102 and 1104, respectively, as represented by the concentric circles 1103 and 1105, respectively.

FIG. 12 illustrates a cross-sectional view of a second example of two air knives 1214 and 1216 whose positioning and geography are defined by the pair of counter-rotating rollers 1202 and 1204, the spray cone, and the target 1212 (e.g., nozzle) in accordance with certain embodiments of the disclosed technology. In the example, the location and positioning of the air knives 1214 and 1216 are defined at least in part by a distance from the counter-rotating rollers 1202 and 1204 as illustrated by respectively corresponding concentric circles 1203 and 1205 and equally by collocation of air knives 1214 and 1216 along the spray cone. In the example, the air knives 1214 and 1216 are positioned at the intersection of the spray cone and concentric circle from the roller and oriented such that the air flow through them is tangential to the concentric circles 1203 and 1205, respectively.

In the example 1200, the position/location of each of the air knives 1214 and 1216 is based on the spray cone emanating from the counter-rotating rollers 1202 and 1204 such that the air knives 1214 and 1216 direct air against the spray cone with the effect of reducing its splay. Further, the orientation of each of the air knives 1214 and 1216 is based on its distance from the closest counter-rotating roller 1202 and 1204, respectively, as represented by the concentric circles 1203 and 1205, respectively.

FIG. 13 illustrates a cross-sectional view of a second example of a collection shell whose curvature is defined by the pair of counter-rotating rollers, the spray cone, and the target in accordance with certain embodiments of the disclosed technology. In the example, the shape (e.g., curvature) of the collection shell 1310 and location/positioning of the air knives 1314 and 1316 are defined at least in part by a distance from the counter-rotating rollers 1302 and 1304 as illustrated by respectively corresponding concentric circles 1303 and 1305. In the example, the air knives 1314 and 1316 are positioned at the intersection of the spray cone and concentric circle from the roller and oriented such that the air flow through them into the interior of the collection shell 1310 is tangential to the concentric circles 1303 and 1305, respectively.

In the example 1300, the position/location of each of the air knives 1314 and 1316 is based on the spray cone emanating from the counter-rotating rollers 1302 and 1304 such that the air knives 1314 and 1316 direct air against the spray cone with the effect of reducing its splay. Further, the orientation of each of the air knives 1314 and 1316 is based on its distance from the closest counter-rotating roller 1302 and 1304, respectively, as represented by the concentric circles 1303 and 1305, respectively.

It will be appreciated that variations of the above-disclosed systems and methods for creating aerosols and other features and functions, or alternatives thereof, may be desirably combined into many other different systems, methods, or applications. Also various presently unforeseen or unanticipated alternatives, modifications, variations, or improvements therein may be subsequently made by those skilled in the art.

The invention claimed is:

1. An aerosol creation system, comprising:
a pair of counter-rotating rollers including a first roller and a second roller and configured to be positioned adjacent each other and define a nip between each other, the nip having an upstream side and a downstream side;
a fluid source configured to provide a fluid to the upstream side of the nip;
wherein the pair of counter-rotating rollers are further configured to rotate in counter rotation with respect to each other and cause the fluid to be drawn through the upstream side of the nip to the downstream side of the nip and leave the downstream side of the nip as filaments that will break up into droplets;
a collection shell configured to be positioned substantially around the pair of counter-rotating rollers, the collection shell having a nozzle configured to allow passage of a spray from the downstream side of the nip; and
a pair of air knives that are positioned opposite each other with respect to the nozzle, the pair including a first air knife and a second air knife that are both integrated with the collection shell and configured to create an air flow in a chamber that is substantially defined between an inner surface of the collection shell and the pair of counter-rotating rollers, wherein the air flow carries the droplets out through the nozzle, wherein the air flow is provided at the downstream side of the nip, wherein the first air knife is positioned downstream of the first roller and generates a first stream of air that is substantially tangential to both a first portion of an inner surface of the collection shell and a first circle that is concentric to the first roller, and further wherein the second air knife is positioned downstream of the second roller and generates a second stream of air that is substantially tangential to both a second portion of the inner surface of the collection shell and a second circle that is concentric to the second roller, each of the first and second streams of air being angled toward the nozzle.

2. The aerosol creation system of claim 1, wherein the collection shell is designed based on a spray cone that is defined by a size of the counter-rotating rollers, a speed of their rotation, and a spray behavior of the fluid being dispensed into the nip.

3. The aerosol creation system of claim 1, wherein the collection shell is modular and configured to integrate with the aerosol creation system.

4. The aerosol creation system of claim 3, wherein the collection shell is further removable from the system.

5. The aerosol creation system of claim 1, wherein the air flow is within a range of 3-30 standard cubic feet per hour.

6. The aerosol creation system of claim 1, wherein positioning and orientation of each of the first and second air knives is based on a spray cone corresponding to the pair of counter-rotating rollers and defined by a size of the counter-rotating rollers, a rotation of the counter-rotating rollers, and a spray behavior of the fluid being dispensed into the nip.

7. The aerosol creation system of claim 1, wherein the collection shell is created by way of one of a group consisting of: three-dimensional (3D) printing, machining, and injection molding.

8. The aerosol creation system of claim 1, wherein the nozzle is selectable based on a spray cone corresponding to the pair of counter-rotation rollers.

9. The aerosol creation system of claim 1, wherein the nozzle is configured to direct the spray from the downstream side of the nip to a limited area through an opening of the nozzle.

10. The aerosol creation system of claim 9, wherein the limited area is a surface of a patient's eye.

11. The aerosol creation system of claim 1, wherein at least one of the air knives has air driven therethrough by one of a group consisting of: a fan, a compressed air canister, and a pressurized air line.

12. The aerosol creation system of claim 1, wherein the system is a handheld device.

13. The aerosol creation system of claim 1, wherein the nozzle is modular and configured to integrate with the collection shell.

14. The aerosol creation system of claim 1, further comprising another collection shell that is configured to replace the collection shell.

* * * * *